US012677286B2

(12) United States Patent
Fu et al.

(10) Patent No.: US 12,677,286 B2
(45) Date of Patent: Jul. 7, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 472 days.

(21) Appl. No.: 17/565,975

(22) Filed: Dec. 30, 2021

(65) Prior Publication Data

US 2022/0124793 A1     Apr. 21, 2022

Related U.S. Application Data

(63) Continuation of application No. PCT/CN2019/105465, filed on Sep. 11, 2019.

(51) Int. Cl.
*H04W 72/23* (2023.01)

(52) U.S. Cl.
CPC .................................... *H04W 72/23* (2023.01)

(58) Field of Classification Search
CPC ...... H04W 72/23; H04L 5/001; H04L 1/1864; H04L 5/0053; H04L 1/1854

(Continued)

(56) References Cited

U.S. PATENT DOCUMENTS 10,645,527 B2 * 5/2020 Kwon ................... H04W 72/23
2016/0021558 A1 * 1/2016 Kim ...................... H04L 5/0098
455/67.11

(Continued)

FOREIGN PATENT DOCUMENTS

CA          3061095 A1 * 11/2018  ......... H04L 27/0006
CN       109788558       5/2019

(Continued)

OTHER PUBLICATIONS

NTT Docomo, R2-1909648, "Support of multiple CG and SPS configurations", 3GPP TSG-RAN WG2 Meeting #107, Aug. 26-30, 2019. Section 2.1, 2.3. Year: 2019 (Year: 2019).*

(Continued)

*Primary Examiner* — Huy D Vu
(74) *Attorney, Agent, or Firm* — Hodgson Russ LLP

(57)          ABSTRACT
Wireless communication methods, a terminal device, and a network device are provided. A wireless communication method includes the following. A terminal device receives a first command transmitted by a network device. The first command is used for activating or releasing a first configured grant (CG) configuration or a first state, where the first state corresponds to at least one CG configuration. The terminal device transmits a feedback media access control (MAC) control element (CE) of the first command to the network device. The feedback MAC CE contains first indication information, where the first indication information is used for indicating whether the feedback MAC CE is feedback of the terminal device on activation or release of a CG configuration and/or feedback of the terminal device on activation or release of a state.

11 Claims, 3 Drawing Sheets

200

RECEIVE, BY A TERMINAL DEVICE, A FIRST COMMAND TRANSMITTED BY A NETWORK DEVICE. THE FIRST COMMAND IS USED FOR ACTIVATING OR RELEASING A FIRST CG CONFIGURATION OR A FIRST STATE, WHERE THE FIRST STATE CORRESPONDS TO AT LEAST ONE CG CONFIGURATION    S210

TRANSMIT, BY THE TERMINAL DEVIXCE, A FEEDBACK MAC CE OF THE FIRST COMMAND TO THE NETWORK DEVICE. THE FEEDBACK MAC CE CONTAINS FIRST INDICATION INFORMATION, WHERE THE FIRST INDICATION INFORMATION IS USED FOR INDICATING WHETHER FEEDBACK MAC CE IS FEEDBACK OF THE TERMINAL DEVICE ON ACTIVATION OR RELEASE OF A CG CONFIGURATION AND/OR FEEDBACK OF THE TERMINAL DEVICE ON ACTIVATION OR RELEASE OF A STATE. ALTERNATIVELY, A RESOURCE CARRYING THE FEEDBACK MAC CE IS USED FOR INDICATING WHETHER THE FEEDBACK MAC CE IS FEEDBACK OF THE TERMINAL DEVICE ON ACTIVATION OR RELEASE OF A CG CONFIGURATION AND/OR FEEDBACK OF THE TERMINAL DEVICE ON ACTIVATION OR RELEASE OF A STATE    S220

(58) Field of Classification Search

USPC .......................... 370/329, 431, 437, 464, 465

See application file for complete search history.

(56) References Cited

U.S. PATENT DOCUMENTS

| | | | |
|---|---|---|---|
| 2019/0190682 A1 | 6/2019 | Kadirl et al. | |
| 2021/0399840 A1* | 12/2021 | Yi et al. | ................ H04L 1/0004 |

FOREIGN PATENT DOCUMENTS

| | | | |
|---|---|---|---|
| CN | 109996338 | 7/2019 | |
| WO | 2019112186 | 6/2019 | |
| WO | WO-2019112186 A1 * | 6/2019 | ............ H04L 5/003 |
| WO | 2019137342 | 7/2019 | |

OTHER PUBLICATIONS

ZTE, R1-1908240, "Enhancements for UL configured grant transmission", 3GPP TSG-RAN WG1 #98, Aug. 26-30, 2019 (Year: 2019).*

Huawei, R2-1907261, "Discussion on Configured Grant Configuration MAC CE", 3GPP TSG-RAN WG2 Meeting 106, May 13-17, 2019 (Year: 2019).*

NTT Docomo, Inc., "Support for Multiple CG and SPS Configurations", 3GPP TSG-RAN WG2 Meeting #107, Aug. 26, 2019, R2-1909648, Czech Republic.

Huawei et al., "Discussion on Sidelink Configured Grant Support", 3GPP TSG-RAN WG2 #107, Aug. 26, 2019, R2-1911072, Czech Republic.

CATT, "Further Discussion on Multiple Active SPS/CGs", 3GPP TSG-RAN WG2 Meeting #106, May 13, 2019, R2-1905743, USA.

EPO, Extended European Search Report for EP 19945250.9, May 11, 2022.

IP India, Examination Report for IN 202127058816, May 6, 2022.

NTT Docomo, Inc., "Summary for Rel.16 7.2.6.6 Enhanced UL configured grant transmission," 3GPP TSG RAN WG1 Meeting #97, R1-1909510, Aug. 26-30, 2019, Prague, CZ.

Samsung, "UL configured grants for eURLLC," 3GPP TSG RAN WG1 #98, R1-1908495, Aug. 26-30, 2019, Prague, CZ.

CNIPA, Notice of Granting Patent Right for CN Application No. 202210061147.6, Apr. 21, 2023.

JPO, Office Action issued for JP Application No. 2021-578173, Aug. 4, 2023.

EPO, Communication for EP Application No. 19945250.9, Jan. 18, 2023.

CNIPA, First Office Action for CN Application No. 202210061147.6, Feb. 16, 2023.

OPPO, "Discussion on confirmation MAC CE for TSC network," 3GPP TSG-RAN WG2 #107, R2-1910016, Aug. 2019.

Panasonic, "Discussion on URLLC enhancements for grant-free transmission," 3GPP TSG RAN WG1 #98, R1-1908801, Aug. 2019.

ZTE, "Other enhancements for Rel-16 URLLC," 3GPP TSG RAN WG1 #98, R1-1908241, Aug. 2019.

JPO, Office Action for JP Application No. 2021-578173, Apr. 4, 2023.

"3rd Generation Partnership Project; Technical Specification Group Radio Access Network; Study on NR Industrial Internet of Things (IOT); Release 16," 3GPP TR 38.825, Mar. 2019, v0.2.0.

"3rd Generation Partnership Project; Technical Specification Group Radio Access Network; NR; Physical layer procedures for control (Release 16)," 3GPP TS 38.213, Jun. 2020, v16.2.0.

"3rd Generation Partnership Project; Technical Specification Group Radio Access Network; NR; Radio Resource Control (RRC) protocol specification (Release 16)," 3GPP TS 38.331, Sep. 2020, v16.2.0.

Ericsson, "Confirmation MAC CE design," 3GPP TSG-RAN WG2 #106, Tdoc R2-1906840 (revision of R2-1904046), May 2019.

Huawei et al., "Discussion on Configured Grant Confirmation MAC CE," 3GPP TSG-RAN WG2 Meeting 106, R2-1907261, May 2019.

WIPO, International Search Report for International Application No. PCT/CN2019/105465, Jun. 4, 2020.

NTT Docomo, Inc., "Enhanced UL transmission with configured grant for URLLC," 3GPP TSG RAN WG1 #98, R1-1909198, Aug. 2019.

ZTE, "Enhancements for UL configured grant transmission," 3GPP TSG RAN WG1 #98, R1-1908240, Aug. 2019.

JPO, Reconsideration Report by Examiner before Appeal for JP Application No. 2021-578173, Dec. 27, 2023.

KIPO, Office Action for KR Application No. 10-2022-7005597, Mar. 6, 2025.

* cited by examiner

100

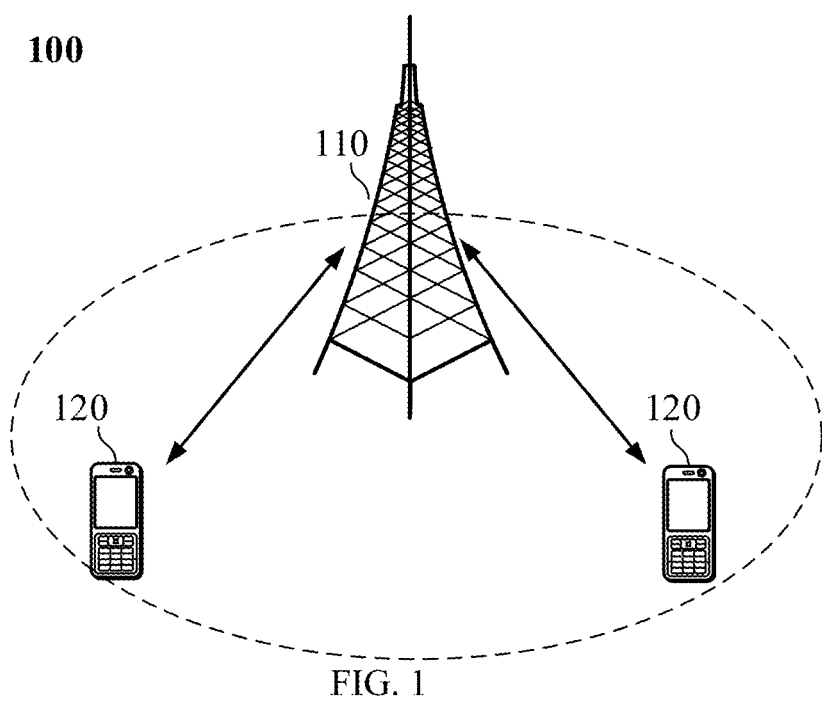

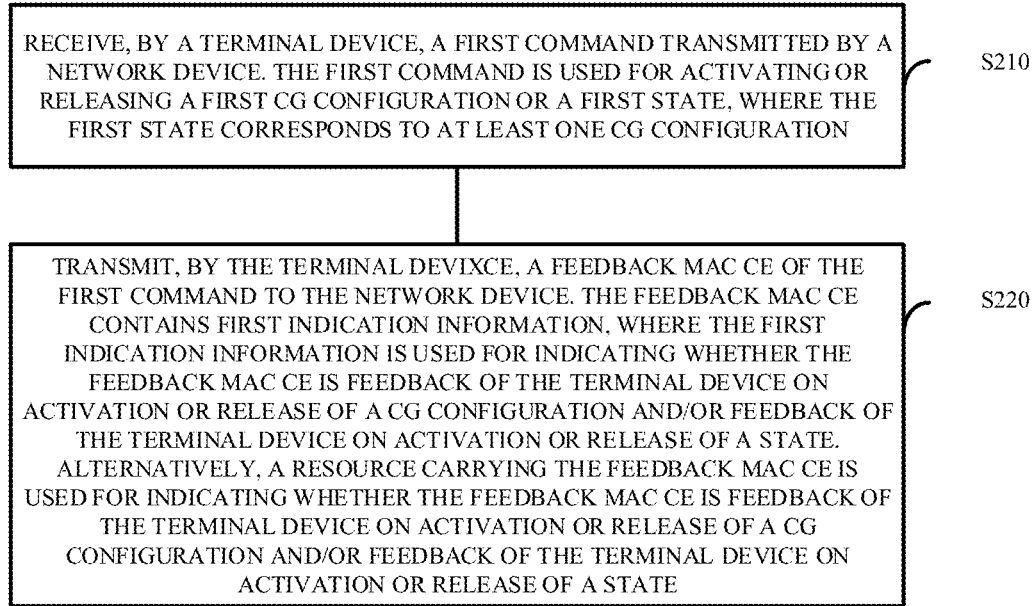

RECEIVE, BY A TERMINAL DEVICE, A FIRST COMMAND TRANSMITTED BY A NETWORK DEVICE. THE FIRST COMMAND IS USED FOR ACTIVATING OR RELEASING A FIRST CG CONFIGURATION OR A FIRST STATE, WHERE THE FIRST STATE CORRESPONDS TO AT LEAST ONE CG CONFIGURATION — S210

TRANSMIT, BY THE TERMINAL DEVIXCE, A FEEDBACK MAC CE OF THE FIRST COMMAND TO THE NETWORK DEVICE. THE FEEDBACK MAC CE CONTAINS FIRST INDICATION INFORMATION, WHERE THE FIRST INDICATION INFORMATION IS USED FOR INDICATING WHETHER THE FEEDBACK MAC CE IS FEEDBACK OF THE TERMINAL DEVICE ON ACTIVATION OR RELEASE OF A CG CONFIGURATION AND/OR FEEDBACK OF THE TERMINAL DEVICE ON ACTIVATION OR RELEASE OF A STATE. ALTERNATIVELY, A RESOURCE CARRYING THE FEEDBACK MAC CE IS USED FOR INDICATING WHETHER THE FEEDBACK MAC CE IS FEEDBACK OF THE TERMINAL DEVICE ON ACTIVATION OR RELEASE OF A CG CONFIGURATION AND/OR FEEDBACK OF THE TERMINAL DEVICE ON ACTIVATION OR RELEASE OF A STATE — S220

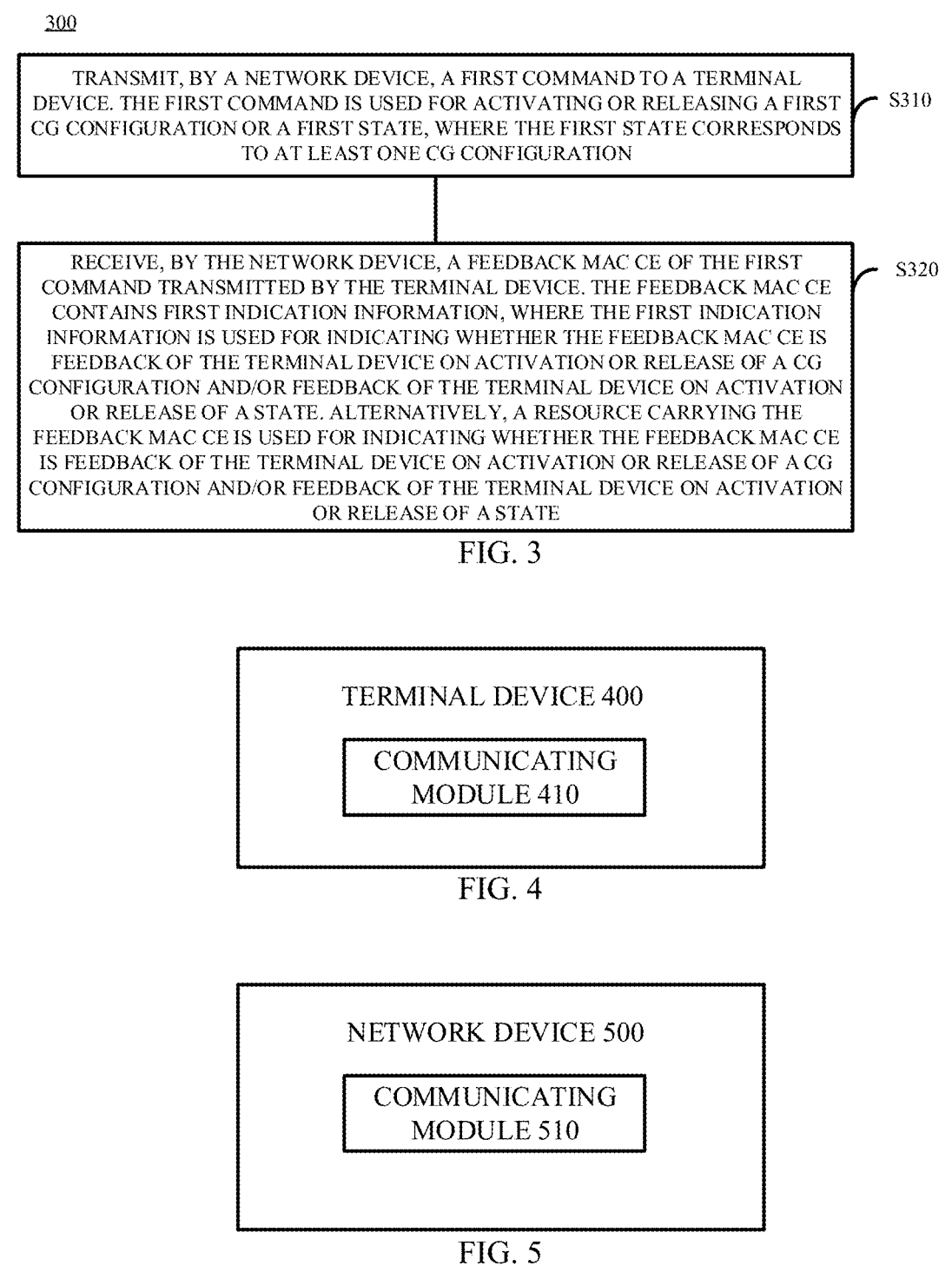

TRANSMIT, BY A NETWORK DEVICE, A FIRST COMMAND TO A TERMINAL DEVICE. THE FIRST COMMAND IS USED FOR ACTIVATING OR RELEASING A FIRST CG CONFIGURATION OR A FIRST STATE, WHERE THE FIRST STATE CORRESPONDS TO AT LEAST ONE CG CONFIGURATION — S310

RECEIVE, BY THE NETWORK DEVICE, A FEEDBACK MAC CE OF THE FIRST COMMAND TRANSMITTED BY THE TERMINAL DEVICE. THE FEEDBACK MAC CE CONTAINS FIRST INDICATION INFORMATION, WHERE THE FIRST INDICATION INFORMATION IS USED FOR INDICATING WHETHER THE FEEDBACK MAC CE IS FEEDBACK OF THE TERMINAL DEVICE ON ACTIVATION OR RELEASE OF A CG CONFIGURATION AND/OR FEEDBACK OF THE TERMINAL DEVICE ON ACTIVATION OR RELEASE OF A STATE. ALTERNATIVELY, A RESOURCE CARRYING THE FEEDBACK MAC CE IS USED FOR INDICATING WHETHER THE FEEDBACK MAC CE IS FEEDBACK OF THE TERMINAL DEVICE ON ACTIVATION OR RELEASE OF A CG CONFIGURATION AND/OR FEEDBACK OF THE TERMINAL DEVICE ON ACTIVATION OR RELEASE OF A STATE — S320

FIG. 3

TERMINAL DEVICE 400

COMMUNICATING MODULE 410

FIG. 4

NETWORK DEVICE 500

COMMUNICATING MODULE 510

FIG. 5

WIRELESS COMMUNICATION METHOD, TERMINAL DEVICE, AND NETWORK DEVICE

CROSS REFERENCE TO RELATED APPLICATION(S)

This application is a continuation of International Application No. PCT/CN2019/105465, filed on Sep. 11, 2019, the entire disclosure of which is incorporated herein by reference.

TECHNICAL FIELD

This disclosure relates to the field of communication, and more particularly to a wireless communication method, a terminal device, and a network device.

RELATED ART

In a new radio (NR) system, a network device can separately control activation or release of one configuration grant (CG), and can also separately control activation or release of one state, where one state may correspond to one CG or multiple CGs. In order to ensure that an activated state or released state indicated by the network device is consistent with that learned by a terminal device, the terminal device needs to feed back to the network device. However, how the terminal device can feed back to indicate a subject of the feedback is a problem to be solved.

SUMMARY

In a first aspect, a wireless communication method is provided. The method includes the following. A terminal device receives a first command transmitted by a network device. The first command is used for releasing a first state, where the first state corresponds to at least one configured grant (CG) configuration. The terminal device transmits a feedback media access control (MAC) control element (CE) of the first command to the network device. The feedback MAC CE contains first indication information, where the first indication information is used for indicating that the feedback MAC CE is feedback of the terminal device on release of a state.

In a second aspect, a wireless communication method is provided. The method includes the following. A network device transmits a first command to a terminal device. The first command is used for releasing a first state, where the first state corresponds to at least one CG configuration. The network device receives a feedback MAC CE of the first command transmitted by the terminal device. The feedback MAC CE contains first indication information, where the first indication information is used for indicating that the feedback MAC CE is feedback of the terminal device on release of a state.

In a third aspect, a terminal device is provided. The terminal device is configured to perform the method described in the first aspect or in any other implementation of the first aspect. The terminal device includes units for performing the method described in the first aspect or in any other implementation of the first aspect.

In a fourth aspect, a network device is provided. The network device is configured to perform the method described in the second aspect or in any other implementation of the second aspect. The network device includes units for performing the method described in the second aspect or in any other implementation of the second aspect.

In a fifth aspect, a terminal device is provided. The terminal device includes a processor and a memory. The memory is configured to store computer programs. The processor is configured to invoke and execute the computer programs stored in the memory, to perform the method described in the first aspect or in any other implementation of the first aspect.

In a sixth aspect, a network device is provided. The network device includes a processor and a memory. The memory is configured to store computer programs. The processor is configured to invoke and execute the computer programs stored in the memory, to perform the method described in the second aspect or in any other implementation of the second aspect.

In a seventh aspect, a chip is provided. The chip is configured to perform the method described in any of the first aspect and the second aspect or in any other implementation of the first aspect or the second aspect. The chip includes a processor. The processor is configured to invoke and execute computer programs stored in a memory, to cause a device equipped with the chip to perform the method described in any of the first aspect and the second aspect or in any other implementation of the first aspect or the second aspect.

In an eighth aspect, a computer readable storage medium is provided. The computer readable storage medium is configured to store computer programs which are operable with a computer to perform the method described in any of the first aspect and the second aspect or in any other implementation of the first aspect or the second aspect.

In a ninth aspect, a computer program product is provided. The computer program product includes computer program instructions which are operable with a computer to perform the method described in any of the first aspect and the second aspect or in any other implementation of the first aspect or the second aspect.

In a tenth aspect, a computer program is provided. The computer program, when executed by a computer, is operable with the computer to perform the method described in any of the first aspect and the second aspect or in any other implementation of the first aspect or the second aspect.

BRIEF DESCRIPTION OF THE DRAWINGS

FIG. 1 is a schematic diagram of an application scenario provided in implementations of the disclosure.

FIG. 2 is a schematic flowchart of a wireless communication method provided in implementations of the disclosure.

FIG. 3 is a schematic flowchart of a wireless communication method provided in other implementations of the disclosure.

FIG. 4 is a schematic block diagram of a terminal device provided in implementations of the disclosure.

FIG. 5 is a schematic block diagram of a network device provided in implementations of the disclosure.

DETAILED DESCRIPTION

Figure 6:
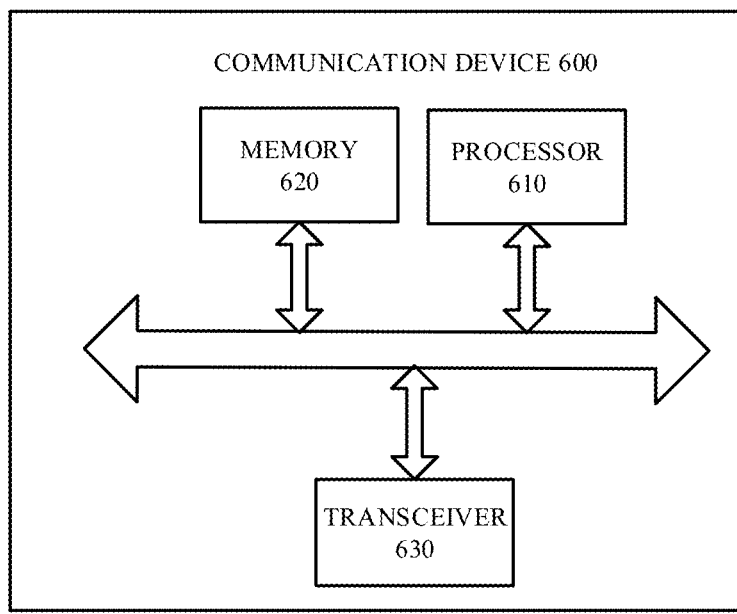
FIG. 6 is a schematic block diagram of a communication device provided in implementations of the disclosure.

The following will describe technical solutions of implementations of the disclosure with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, a $5^{th}$ generation (5G) system, or the like.

FIG. 1 illustrates a communication system 100 of implementations of the disclosure. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in a 5G network, a terminal device in the future evolved PLMN, etc.

Optionally, terminal devices 120 can communicate with each other through device to device (D2D) communication.

Optionally, the 5G system or 5G network can also be referred to as a new radio (NR) system or NR network.

FIG. 1 exemplarily illustrates one network device and two terminal devices. The communication system 100 may also include multiple network devices, and there can be other numbers of terminal devices in a coverage area of each of the network devices, which is not limited herein.

Optionally, the communication system 100 may further include other network entities such as a network controller, a mobile management entity, or the like, and the disclosure is not limited in this regard.

It should be understood that, a device with communication functions in a network/system of implementations can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In some scenarios, the network device can indicate that the terminal device activates or releases a configured grant (CG) configuration. In this case, it is necessary for the terminal device to trigger confirmation or feedback of a configured uplink (UL) grant. If the confirmation or feedback of the configured UL grant is triggered, and currently there is a UL resource used for initial transmission, the terminal device indicates that a CG confirmation media access control (MAC) control element (CE) is generated in a multiplexing packetization process. Specifically, the terminal device may indicate that an entity (such as a multiplexing packetization entity) schedules a multiplexing packetization process to generate the CG confirmation MAC CE. The CG confirmation MAC CE carries feedback information, and the CG confirmation MAC CE is contained in a UL MAC protocol data unit (PDU) to be transmitted to the network device. The CG confirmation MAC CE has a fixed size of 0 bit, that is, the feedback information is carried in the CG confirmation MAC CE, and the CG confirmation MAC CE does not contain any information.

In other scenarios, the network device can indicate that the terminal device activates or releases a state. In this case, it is also necessary for the terminal device to feed back an activated state or released state of the state. The state may correspond to one or more CG configurations. A correspondence between states and CG configurations may be configured by the network device. To this end, how the terminal device can feed back as well as differentiating between feedback on an activated or released state of a state and feedback on an activated or released state of a CG configuration, is a problem to be solved.

FIG. 2 is a schematic flowchart of a wireless communication method 200 provided in implementations of the disclosure. The method 200 may be implemented by the terminal device in the communication system illustrated in FIG. 1. As illustrated in FIG. 2, the method 200 includes at least some of the following operations.

At S210, a terminal device receives a first command transmitted by a network device. The first command is used for activating or releasing a first CG configuration or a first state, where the first state corresponds to at least one CG configuration.

At S220, the terminal device transmits a feedback MAC CE of the first command to the network device. The feedback MAC CE contains first indication information, where the first indication information is used for indicating whether the feedback MAC CE is feedback of the terminal device on activation or release of a CG configuration and/or feedback of the terminal device on activation or release of a state. Alternatively, a resource carrying the feedback MAC CE is used for indicating whether the feedback MAC CE is feedback of the terminal device on activation or release of a CG configuration and/or feedback of the terminal device on activation or release of a state.

With the above technical solutions, by means of first indication information in confirmation MAC CE (that is, feedback MAC CE) or a resource used for transmitting the confirmation MAC CE, the terminal device can indicate to the network device whether the MAC CE is the feedback of the terminal device on activation or release of a CG configuration and/or the feedback of the terminal device on activation or release of a state, which is possible to achieve consistency between the network device and the terminal device on whether activation or release is that of a CG configuration or that of a state.

It should be understood that, in implementations herein, "the feedback of the terminal device on activation or release of a CG configuration" may also be referred to as feedback of the terminal device on activation or release of a CG. Similarly, "one state corresponds to one or more CG configurations" may mean that one state corresponds to one or more CGs. In other words, in implementations herein, "CG" and "CG configuration" may be used interchangeably.

It should be understood that, in implementations of the disclosure, the "feedback MAC CE" may also be referred to as confirmation MAC CE.

In some implementations, the network device may activate or release (or deactivate) one CG configuration through the first command, or may transmit multiple first commands to activate or release multiple CG configurations, or may activate or release one or more CG configurations through the first command. Such a manner can be called separate activation or separate release (that is, separate deactivation). When a CG configuration is activated, the terminal device can use the CG configuration for UL transmission. When a CG configuration is released, the terminal device cannot use the CG configuration for UL transmission, but can use other activated CG configurations or a dynamic resource for UL transmission.

In some other implementations, the network device can activate or release one or more states through the first command, where each state corresponds to one or more CG configurations. Such a manner can be called joint-activation or joint-release (that is, joint-deactivation). When a state is activated, the terminal device can use a CG configuration corresponding to the state for UL transmission. When a state is released, the terminal device cannot use a CG configuration corresponding to the state for UL transmission, but can use a CG configuration corresponding to other activated states or a dynamic resource for UL transmission.

It should be understood that, in implementations of the disclosure, one state may correspond to one or more CG configurations. A correspondence between states and CG configurations may be configured by the network device. Optionally, the network device may configure the correspondence for the terminal device through higher layer signaling. The correspondence may be in the form of table. In such a table, each state corresponds to one or more CG configurations. Alternatively, when configuring a CG, the network device may add an identifier of a state (for example, when configuring a CG, the network device may add one or more state identifier indications), to indicate the state(s) corresponding to the CG configuration.

In some implementations, the higher layer signaling is a dedicated radio resource control (RRC) message. As an example, the dedicated RRC message may be an RRC reconfiguration message or a CG configuration (configuredgrantConfig) message, where configuredgrantConfig message is used for configuring one or more CG configurations for the terminal device.

Optionally, in some implementations, the first command may be downlink control information (DCI), or may be other downlink (DL) messages or DL channels, and the disclosure is not limited in this regard.

Optionally, in some implementations, first DCI includes a first identifier and an activation state indication, where the activation state indication is used for indicating to activate or release a CG configuration or a state corresponding to the first identifier.

Optionally, the first identifier may be used for indicating one or more CG configurations, that is, the first CG configuration may include one or more CG configurations. Alternatively, the first identifier may be used for indicating one or more states, that is, the first state may include one or more states.

In implementations of the disclosure, the first DCI further includes second indication information, where the second indication information is used for indicating whether the first identifier is an identifier of a CG configuration or an identifier of a state. Therefore, according to the second indication information as well as the first identifier, it is possible to determine a CG configuration or a state to be activated or released based on the activation state indication.

Upon receiving the first command, the terminal device can activate or release the first CG configuration or a CG configuration corresponding to the first state according to the first command. Then the terminal device can transmit a feedback message to the network device, where the feedback message is used for notifying the network device that the terminal device has activated or released the first CG configuration or a CG configuration corresponding to the first state, thereby ensuring consistency between the network device and the terminal device. The feedback message contains feedback information used for feeding back an activated or released state of a CG configuration or a state.

In some implementations, the feedback message may be a feedback MAC CE, that is, the terminal device can transmit feedback information to the network device through a MAC CE. In other implementations, the terminal device can transmit the feedback information to the network device through other uplink (UL) messages or UL channels, for example, UL RRC signaling, UL physical-layer signaling, a physical uplink shared channel (PUSCH), etc. Hereinafter, a feedback MAC CE will be taken as an example of the feedback message for illustration, but the disclosure is not limited in this regard.

In implementations of the disclosure, the feedback MAC CE may be feedback on one first command, or may be feedback on multiple first commands. In other words, the terminal device may receive one first command and feed back through one MAC CE, or may receive multiple first commands and then feed back jointly, and the disclosure is not limited in this regard.

In implementations of the disclosure, when the first command is used for activating or releasing the first CG configuration, the feedback MAC CE at least contains feedback information of the first CG configuration. Alternatively, when the first command is used for activating or releasing the first state, the feedback MAC CE at least contains feedback information of the first state.

In some implementations, the feedback information of the first CG configuration includes at least one of: an identifier of a cell corresponding to the first CG configuration, an identifier of a bandwidth part (BWP) corresponding to the first CG configuration, an identifier of the first CG configuration, or state indication information of the first CG configuration, where the state indication information of the first CG configuration is used for indicating whether the first CG configuration is in an activated state or in a released state.

Optionally, the identifier of a cell corresponding to the first CG configuration may be an index of the cell, or may be a first bitmap. The first bitmap may have multiple bits which are in one-to-one correspondence with multiple cells. Each bit is indicative of whether a cell corresponding to the bit is valid (that is, whether the cell is a cell corresponding to a CG fed back). For example, if the value of the bit is 0, it indicates "invalid" (that is, the cell is not a cell corresponding to a CG fed back); and if the value is 1, it indicates "valid" (that is, the cell is a cell corresponding to a CG fed back). In this scenario, the cell corresponding to the first CG configuration may include a cell corresponding to a bit with a value of 1 in the first bitmap.

Optionally, the identifier of a BWP corresponding to the first CG configuration may be an index of the BWP, or may be a second bitmap. The second bitmap may have multiple bits which are in one-to-one correspondence with multiple BWPs. Each bit is indicative of whether a BWP corresponding to the bit is valid (that is, whether the BWP is a BWP corresponding to a CG fed back). For example, if the value of the bit is 0, it indicates "invalid" (that is, the BWP is not a BWP corresponding to a CG fed back); and if the value is 1, it indicates "valid" (that is, the BWP is a BWP corresponding to a CG fed back). In this scenario, the BWP corresponding to the first CG configuration may include a BWP corresponding to a bit with a value of 1 in the second bitmap.

Optionally, the identifier of the first CG configuration may be an index of the first CG configuration, or may be a third bitmap. The third bitmap may have multiple bits which are in one-to-one correspondence with multiple CG configurations. Each bit is indicative of whether a CG configuration corresponding to the bit is activated or released. For example, if the value of the bit is 0, it indicates "released"; and if the value of the bit is 1, it indicates "activated". Alternatively, each bit is indicative of whether a CG configuration corresponding to the bit is valid (that is, whether the CG is to be fed back). For example, if the value of the bit is 0, it indicates "invalid"; and if the value of the bit is 1, it indicates "valid". In this scenario, the first CG configuration may include a CG configuration corresponding to a bit with a value of 1 in the third bitmap.

Optionally, the state indication information of the first CG configuration may have one bit. Different values of the one bit are used for indicating whether the first CG configuration is activated or released. For example, if the value of the one bit is 0, it indicates that the first CG configuration is released; and if the value of the one bit is 1, it indicates that the first CG configuration is activated. In one implementation, if the first command is used for indicating to activate the first CG configuration, the value of the state indication information of the first CG configuration contained in the feedback MAC CE is 1, which indicates that the first CG configuration is "activated".

In some implementations, the feedback information of the first state includes at least one of: an identifier of the first state, an identifier of a cell corresponding to the first state, an identifier of a BWP corresponding to the first state, or state indication information of the first state, where the state indication information of the first state is used for indicating whether the first state is an activated state or a released state.

Optionally, the identifier of the first state may be an index of the first state, or may be a fourth bitmap. The fourth bitmap may have multiple bits which are in one-to-one correspondence with multiple states. Each bit is indicative of whether a state corresponding to the bit is activated or released. For example, if the value of the bit is 0, it indicates "released"; and if the value of the bit is 1, it indicates "activated". Alternatively, each bit is indicative of whether a state corresponding to the bit is valid (that is, whether the state is to be fed back). For example, if the value of the bit is 0, it indicates "invalid"; and if the value of the bit is 1, it indicates "valid". In this scenario, the first state may include a state corresponding to a bit with a value of 1 in the fourth bitmap.

The identifier of a cell corresponding to the first state may be an index of the cell, or may be the fifth bitmap. The fifth bitmap may have multiple bits which are in one-to-one correspondence with multiple cells. Each bit is indicative of whether a cell corresponding to the bit is valid (that is, whether the cell is a cell corresponding to a state fed back). For example, if the value of the bit is 0, it indicates "invalid" (that is, the cell is not a cell corresponding to a state fed back); and if the value of the bit is 1, it indicates "valid" (that is, the cell is a cell corresponding to a state fed back). In this scenario, the cell corresponding to the first state may include a cell corresponding to a bit with a value of 1 n the fifth bitmap.

The identifier of a BWP corresponding to the first state may be an index of the BWP, or may be a sixth bitmap. The sixth bitmap may have multiple bits which are in one-to-one correspondence with multiple BWPs. Each bit is indicative of whether a BWP corresponding to the bit is valid (that is, whether the BWP is a BWP corresponding to a state fed back). For example, if the value of the bit is 0, it indicates "invalid" (that is, the BWP is not a BWP corresponding to a state fed back); and if the value of the bit is 1, it indicates "valid" (that is, the BWP is a BWP corresponding to a state fed back). In this scenario, the BWP corresponding to the first state may include a BWP corresponding to a bit with a value of 1 in the sixth bitmap.

Optionally, in some implementations, the state indication information of the first state may have one bit. Different values of the one bit are indicative of whether the first state is "activated" or "released". For example, if the value of the one bit is 0, it indicates that the first state is "released"; and if the value of the one bit is 1, it indicates that the first state is "activated". As a specific implementation, if the first command is used for indicating to activate the first state, the value of the state indication information of the first state contained in the feedback MAC CE is 1, which indicates that the first state is "activated".

In implementations of the disclosure, in order to differentiate the granularity of the feedback information contained in the feedback MAC CE, that is, whether the feedback information is feedback on activation or release of a CG configuration or feedback on activation or release of a state, in some implementations, the feedback MAC CE may contain the first indication information, where the first indication information is used for determining the granularity of the feedback information. Alternatively, in some other implementations, a resource used for carrying the feedback MAC CE is used for determining the granularity of the feedback information.

As an example, the granularity of the feedback information indicated by the first indication information or the resource used for carrying the feedback MAC CE is one of the following.

CG configuration, that is, the feedback MAC CE is the feedback of the terminal device on activation or release of a CG configuration. In other words, the feedback information in the feedback MAC CE is feedback information on activation or release of a CG configuration.

State, that is, the feedback MAC CE is the feedback on activation or release of a state. In other words, the feedback information in the feedback MAC CE is feedback information on activation or release of a state.

As another example, the granularity of the feedback information indicated by the first indication information or the resource used for carrying the feedback MAC CE is one of the following.

CG configuration, that is, the feedback MAC CE is the feedback of the terminal device on activation or release of a CG configuration. In other words, the feedback information in the feedback MAC CE is feedback information on activation or release of a CG configuration.

State, that is, the feedback MAC CE is the feedback on activation or release of a state. In other words, the feedback information in the feedback MAC CE is feedback information on activation or release of a state.

CG configuration and state, that is, the feedback MAC CE is the feedback on activation or release of a CG configuration and the feedback on activation or release of a state. In other words, the feedback information in the feedback MAC CE is feedback information on activation or release of a CG configuration and activation or release of a state.

The following will elaborate the implementations in connection with specific embodiments.

Implementation 1

The first indication information may be a logical channel identity (LCD), where different values of the LCID are used for indicating whether the feedback MAC CE is the feedback of the terminal device on activation or release of a CG configuration and/or the feedback of the terminal device on activation or release of a state.

A reserved value (that is, an invalid value) of the LCID in the feedback MAC CE may be used for indicating whether the feedback MAC CE is the feedback on activation or release of a CG configuration or the feedback on activation or release of a state, or includes both of the above.

For example, the LCID may be set to a first value (denoted as LCID 1), which indicates that the feedback MAC CE is the feedback on activation or release of a CG configuration. Alternatively, the LCID may be set to a second value (denoted as LCID 2), which indicates that the feedback MAC CE is the feedback on activation or release of a state. Still alternatively, the LCID may be set to a third value (denoted as LCID 3), which indicates that the feedback MAC CE is the feedback on activation or release of a CG configuration and activation or release of a state.

In this implementation, if the LCID is of the third value, the feedback MAC CE contains both first feedback information of the terminal device on activation or release of the first CG configuration and second feedback information of the terminal device on activation or release of the first state. There is no restriction on the locations of the first feedback information and the second feedback information in this implementation. For example, the first feedback information may be located before the second feedback information, or the second feedback information may be located before the first feedback information.

Implementation 2

The first indication information may have at least one bit, where different values of the at least one bit are used for indicating whether the feedback MAC CE is the feedback of the terminal device on activation or release of a CG configuration and/or the feedback of the terminal device on activation or release of a state.

In some implementations, the at least one bit may be a new bit in a MAC CE, where the new bit is used for indicating whether the MAC CE is the feedback of the terminal device on activation or release of a CG configuration, or the feedback of the terminal device on activation or release of a state, or feedback on both of activation or release of a CG configuration and activation or release of a state.

In some implementations, the at least one bit may be a new bit in a MAC CE subheader.

As an example, the first indication information has one bit. If the one bit is of a first value (such as 0), it indicates that the feedback MAC CE is the feedback on activation or release of a CG configuration. If the one bit is of a second value (such as 1), it indicates that the feedback MAC CE is the feedback on activation or release of a state.

As another example, the first indication information has two bits. Different values of the two bits are used for indicating whether the feedback MAC CE is the feedback of the terminal device on activation or release of a CG configuration, or the feedback of the terminal device on activation or release of a state, or feedback on both of the above. For example, if the two bits is of a first value (such as 00), it indicates that the feedback MAC CE is the feedback on activation or release of a CG configuration. If the two bits is of a second value (such as 01), it indicates that the feedback MAC CE is the feedback on activation or release of a state. If the two bits is of a third value (such as 10 or 11), it indicates that the feedback MAC CE is feedback on activation or release of a CG configuration and activation or release of a state.

Still another example, the first indication information has a first bit and a second bit, where a value of the first bit is used for indicating whether the feedback MAC CE contains feedback information of the terminal device on activation or release of a CG configuration, and a value of the second bit is used for indicating whether the feedback MAC CE contains the feedback information of the terminal device on activation or release of a state.

For example, if the value of the first bit is 1, it indicates that the feedback MAC CE contains the feedback information of the terminal device on activation or release of a CG configuration. In this scenario, the feedback MAC CE contains the feedback information of the terminal device on the first CG configuration. Alternatively, if the value of the first bit is 0, it indicates that the feedback MAC CE does not contain the feedback information of the terminal device on activation or release of a CG configuration. In this scenario, the feedback MAC CE does not contain the feedback information of the terminal device on the first CG configuration.

For another example, if the value of the second bit is 1, it indicates that the feedback MAC CE contains the feedback information of the terminal device on activation or release of a state. In this scenario, the feedback MAC CE contains the feedback information of the terminal device on the first state. Alternatively, if the value of the second bit is 0, it indicates that the feedback MAC CE does not contain the feedback information of the terminal device on activation or release of a state. In this scenario, the feedback MAC CE does not contain the feedback information of the terminal device on the first state.

In this implementation, if the feedback MAC CE contains both first feedback information of the terminal device on activation or release of the first CG configuration and second feedback information of the terminal device on activation or release of the first state, there is no restriction on the locations of the first feedback information and the second feedback information in this implementation. For example, the first feedback information may be located before the second feedback information, or the second feedback information may be located before the first feedback information. Implementation 3

The terminal device may indicate, by means of the resource carrying the feedback MAC CE, whether the feedback MAC CE is the feedback of the terminal device on activation or release of a CG configuration, or the feedback of the terminal device on activation or release of a state, or feedback on both of the above.

In some implementations, if the feedback MAC CE is carried on a first resource, it indicates that the feedback MAC CE is the feedback of the terminal device on activation or release of a CG configuration. If the feedback MAC CE is carried on a second resource, it indicates that the MAC CE is feedback on activation or release of a state. If the feedback MAC CE is carried on a third resource, it indicates that the MAC CE is feedback on activation or release of a CG configuration and activation or release of a state.

It should be noted that, in implementations, if the feedback MAC CE is carried on the third resource, the feedback MAC CE contains both first feedback information of the terminal device on activation or release on the first CG configuration and second feedback information of the terminal device on activation or release of the first state. There is no restriction on the locations of the first feedback information and the second feedback information in implementations. For example, the first feedback information may be located before the second feedback information, or the second feedback information may be located before the first feedback information. Therefore, in implementations, there is no need to add a new bit. By means of the resource carrying the feedback MAC CE, it is possible to implicitly indicate whether the feedback MAC CE is the feedback of the terminal device on activation or release of a CG configuration, or the feedback on activation or release of a state, or feedback on both of the above. As such, the terminal device can notify the network device of the granularity of feedback information contained in the feedback MAC CE, thereby achieving consistency between the terminal device and the network device on whether activation or release is related to a CG configuration or a state, and on the other hand, signaling overhead can be reduced.

Optionally, in some implementations, the resource carrying the feedback MAC CE includes at least one of: a time-domain resource used for carrying the feedback MAC CE, a frequency-domain resource used for carrying the feedback MAC CE, a port used for carrying the feedback MAC CE, a code-domain resource used for carrying the feedback MAC CE, a beam used for carrying the feedback MAC CE, a beam used for carrying a PUSCH of the feedback MAC CE, a port used for carrying a PUSCH of the feedback MAC CE, or a code-domain resource used for carrying a PUSCH of the feedback MAC CE.

Optionally, the code-domain resource may include a scrambled feedback MAC CE or a scrambling code sequence of a PUSCH resource of the feedback MAC CE.

In other words, by means of different time-domain resources, different frequency-domain resources, different ports, different beams, and/or different code-domain resources, the terminal device can transmit the feedback MAC CE or transmit a PUSCH carrying the feedback MAC CE, to differentiate the granularity of the feedback information contained in the feedback MAC CE.

In other implementations, the terminal device may transmit feedback information by carrying the feedback information in a resource, for example, by carrying the feedback information in the PUSCH of the feedback MAC CE. In this scenario, the resource may refer to a time-domain resource used for carrying the PUSCH, a frequency-domain resource used for carrying the PUSCH, a scrambling code sequence used for scrambling the PUSCH, a beam used for transmitting the PUSCH, a port used for transmitting the PUSCH, a modulation and coding mode of the PUSCH, etc. In other words, the terminal device may indicate the granularity of the feedback information through a resource or transmission mode of a channel or message carrying the feedback information, which is conducive to reducing signaling overhead.

The following will describe in detail the manners of reporting the feedback information of implementations in connection with specific examples.

The network device may configure multiple CG configurations for the terminal device, for example, CG configurations with CG indexes of 1, 2, 3, 4, and 5.

Optionally, the network device may configure a state table (corresponds to the correspondence between states and CG configurations described above) for the terminal device. The state table contains multiple states, where each state corresponds to one state index, and each state may correspond to one or more CG configurations. As an example, state 1 corresponds to CG index 1, CG index 2, and CG index 3, and state 2 corresponds to CG index 1 and CG index 4. In some implementations, the network device may indicate a state index corresponding to a CG resource when configuring the CG resource.

The network device may indicate, through DCI, that the terminal device activates a CG configuration corresponding to CG index 5.

Once receiving the DCI, the terminal device activates the CG configuration corresponding to CG index 5, while other CG configurations are in a released state. Then the terminal device transmits the feedback MAC CE to the network device.

In implementation 1, the LCID in the feedback MAC CE is LCID 1, which indicates that the feedback MAC CE of the terminal device is the feedback on activation or release of a CG configuration, that is, the granularity of the feedback information is a CG granularity.

In an embodiment of implementation 2, the feedback MAC CE has one bit. The value of the one bit is 0, which indicates that the feedback MAC CE of the terminal device is the feedback on activation or release of a CG configuration, that is, the granularity of the feedback information is a CG granularity.

In another embodiment of implementation 2, the feedback MAC CE has the first bit and the second bit. The value of the first bit is 1, which indicates that the feedback MAC CE of the terminal device contains the feedback information on activation or release of a CG configuration. The value of the second bit is 0, which indicates that the feedback MAC CE of the terminal device does not contain the feedback information on activation or release of a state.

In implementation 3, the feedback MAC CE is carried on the first resource, which indicates that the feedback MAC CE of the terminal device is the feedback on activation or release of a CG configuration, that is, the granularity of the feedback information is a CG granularity.

The feedback MAC CE may further contain feedback information on an activated or released state of the CG configuration corresponding to CG index 5. For details, reference can be made to the implementation of the feedback information of the first CG configuration, which will not be repeated herein.

In some implementations, the network device may indicate, through first DCI, to activate a CG configuration corresponding to CG index 1, and indicate, through second DCI, to activate a CG configuration corresponding to CG index 4.

Once receiving the first DCI and the second DCI, the terminal device can activate corresponding CG configurations, that is, activate a CG configuration corresponding to CG index 1 and a CG configuration corresponding to CG index 4. Then the terminal device can transmit the feedback MAC CE to the network device, where the feedback MAC CE contains the first indication information that is indicative of the granularity of the feedback information in the feedback MAC CE. For details, reference can be made to the related descriptions above, which will not be repeated herein. The feedback MAC CE further contains feedback information of the terminal device on an activated or released state of the CG configuration corresponding to CG index 1 and an activated or released state of the CG configuration corresponding to CG index 4. For details, reference can be made to the implementation of the feedback information of the first CG configuration, which will not be repeated herein.

In some implementations, the network device can indicate, through third DCI, to release a state corresponding to state index 2.

Once receiving the third DCI, the terminal device may release a CG configuration corresponding to the state, that is, release a CG configuration corresponding to CG index 1 and a CG configuration corresponding to CG index 4. Then the terminal device transmits the feedback MAC CE to the network device.

In implementation 1, the LCID in the feedback MAC CE is LCID 2, which indicates that the feedback MAC CE of the terminal device is the feedback on activation or release of a state, that is, the granularity of the feedback information is a state granularity.

In an embodiment of implementation 2, the feedback MAC CE has one bit. The value of the one bit is 1, which indicates that the feedback MAC CE of the terminal device is the feedback on activation or release of a state, that is, the granularity of the feedback information is a state granularity.

In another embodiment of implementation 2, the feedback MAC CE has the first bit and the second bit. The value of the first bit is 0, which indicates that the feedback MAC CE of the terminal device does not contain the feedback information on activation or release of a CG configuration. The value of the second bit is 1, which is indicates that the feedback MAC CE of the terminal device contains the feedback information on activation or release of a state.

In implementation 3, the feedback MAC CE is carried on the second resource, which indicates that the feedback MAC CE of the terminal device is the feedback on activation or release of a state, that is, the granularity of the feedback information is a state granularity.

The feedback MAC CE may further contain feedback information on an activated or released state of state 2. For details, reference can be made to the implementation the feedback information of the first state, which will not be repeated herein.

In this scenario, an activated-released state of each CG configuration of the terminal device is: the CG configurations corresponding to CG indexes 1-4 are released, and the CG configuration corresponding to CG index 5 is activated.

It should be noted that, in implementations of the disclosure, if the terminal device sequentially receives multiple pieces of DCI, and the multiple pieces of DCI contain different activation-release indications for the same CG configuration (for example, if the terminal device first receives the first DCI which indicates to release the CG configuration corresponding to CG index 1, and then receives the second DCI which indicates to activate the CG configuration corresponding to CG index 1, where the two pieces of DCI may indicate the same granularity (for instance, both indicate a CG granularity), or may indicate different granularities (for instance, one indicates a CG granularity, and the other indicates a state granularity)), the terminal device follows an indication of one of the multiple pieces of DCI, for example, the terminal device follows an indication of DCI that is received later (i.e. the second DCI). If the terminal device follows the indication of the DCI that is received later, state indication information of the CG configuration corresponding to CG index 1 is further carried in the feedback MAC CE, to indicate that the CG configuration corresponding to CG index 1 is activated. Accordingly, the network device follows state indication information carried in a feedback MAC CE that is received later. Alternatively, if feedbacks on the above two pieces of DCI are carried in one feedback MAC CE, the terminal device feeds back according to the indication of the DCI that is last received, that is, feeds back that the CG configuration corresponding to the CG index 1 is activated. As such, it is possible to achieve consistency between the network device and the terminal device in terms of activation or release of a CG configuration.

The wireless communication method according to implementations has been elaborated above from the perspective of the terminal device with reference to FIG. 2. The following will describe in detail a wireless communication method according to other implementations from the perspective of the network device with reference to FIG. 3. It should be understood that, descriptions of a network-device side and descriptions of a terminal-device side correspond to each other. For similar descriptions, reference can be made to the foregoing descriptions, which will not be repeated herein to avoid repetition.

FIG. 3 is a schematic flowchart of a wireless communication method 300 provided in other implementations of the disclosure. The method 300 may be performed by the network device in the communication system illustrated in FIG. 1. As illustrated in FIG. 3, the method 300 includes the following.

At S310, a network device transmits a first command to a terminal device. The first command is used for activating or releasing a first CG configuration or a first state, where the first state corresponds to at least one CG configuration.

At S320, the network device receives a feedback MAC CE of the first command transmitted by the terminal device.

The feedback MAC CE contains first indication information, where the first indication information is used for indicating whether the feedback MAC CE is feedback of the terminal device on activation or release of a CG configuration and/or feedback of the terminal device on activation or release of a state.

Alternatively, a resource carrying the feedback MAC CE is used for indicating whether the feedback MAC CE is feedback of the terminal device on activation or release of a CG configuration and/or feedback of the terminal device on activation or release of a state.

Optionally, in some implementations, when the first command is used for activating or releasing the first CG configuration, the feedback MAC CE at least contains feedback information of the first CG configuration. Alternatively, when the first command is used for activating or releasing the first state, the feedback MAC CE at least contains feedback information of the first state.

Optionally, in some implementations, the feedback information of the first CG configuration includes at least one of: an identifier of a cell corresponding to the first CG, an identifier of a BWP corresponding to the first CG, an identifier of the first CG, or state indication information of the first CG, where the state indication information of the first CG is used for indicating whether the first CG is in an activated state or in a released state.

Optionally, in some implementations, the feedback information of the first state includes at least one of: an identifier of the first state, an identifier of a cell corresponding to the first state, an identifier of a BWP corresponding to the first state, or state indication information of the first state, where the state indication information of the first state is used for indicating whether the first state is an activated state or a released state.

Optionally, in some implementations, the first indication information is an LCID, where different values of the LCID are used for indicating whether the feedback MAC CE is the feedback of the terminal device on activation or release of a CG configuration and/or the feedback of the terminal device on activation or release of a state.

Optionally, in some implementations, the first indication information has at least one bit, where different values of the at least one bit are used for indicating whether the feedback MAC CE is the feedback of the terminal device on activation or release of a CG configuration and/or the feedback of the terminal device on activation or release of a state.

Optionally, in some implementations, the first indication information has a first bit and a second bit, where a value of the first bit is used for indicating whether the feedback MAC CE contains feedback information of the terminal device on activation or release of a CG configuration, and a value of the second bit is used for indicating whether the feedback MAC CE contains the feedback information of the terminal device on activation or release of a state.

Optionally, in other implementations, the first indication information has one bit, where different values of the one bit are used for indicating whether the feedback MAC CE is the feedback of the terminal device on activation or release of a CG configuration and/or the feedback of the terminal device on activation or release of a state.

Optionally, in some implementations, the resource carrying the feedback MAC CE includes at least one of: a time-domain resource used for carrying the feedback MAC CE, a frequency-domain resource used for carrying the feedback MAC CE, a port used for carrying the feedback MAC CE, a code-domain resource used for carrying the feedback MAC CE, a beam used for carrying the feedback MAC CE, a beam used for carrying a PUSCH of the feedback MAC CE, a port used for carrying a PUSCH of the feedback MAC CE, or a code-domain resource used for carrying a PUSCH of the feedback MAC CE.

Optionally, in some implementations, operations at S310 may be performed as follows. The network device transmits first DCI to the terminal device, where the first DCI includes a first identifier and an activation state indication, and the activation state indication is used for indicating to activate or release a CG configuration or a state corresponding to the first identifier.

Optionally, in some implementations, the first DCI further includes second indication information, where the second indication information is used for indicating whether the first identifier is an identifier of a CG configuration or an identifier of a state.

Optionally, in some implementations, the method further includes the following. The network device transmits higher layer signaling to the terminal device, where the higher layer signaling contains a correspondence between states and CG configurations.

Optionally, in some implementations, the higher layer signaling is a dedicated RRC message.

Method implementations of the disclosure have been elaborated above with reference to FIG. 2 and FIG. 3. The following will elaborate apparatus implementations of the disclosure with reference to FIG. 4 to FIG. 7. It should be understood that, apparatus implementations and method implementations correspond to each other. For similar descriptions, reference can be made to the method implementations.

FIG. 4 is a schematic block diagram of a terminal device 400 provided in implementations of the disclosure. As illustrated in FIG. 4, the terminal device 400 includes a communicating module 410. The communicating module 410 is configured to operate as follows. The communicating module 410 is configured to receive a first command transmitted by a network device. The first command is used for activating or releasing a first CG configuration or a first state, where the first state corresponds to at least one CG configuration. The communicating module 410 is configured to transmit a feedback MAC CE of the first command to the network device. The feedback MAC CE contains first indication information, where the first indication information is used for indicating whether the feedback MAC CE is feedback of the terminal device on activation or release of a CG configuration and/or feedback of the terminal device on activation or release of a state. Alternatively, a resource carrying the feedback MAC CE is used for indicating whether the feedback MAC CE is feedback of the terminal device on activation or release of a CG configuration and/or feedback of the terminal device on activation or release of a state.

Optionally, in some implementations, when the first command is used for activating or releasing the first CG configuration, the feedback MAC CE at least contains feedback information of the first CG configuration. Alternatively, when the first command is used for activating or releasing the first state, the feedback MAC CE at least contains feedback information of the first state.

Optionally, in some implementations, the feedback information of the first CG configuration includes at least one of: an identifier of a cell corresponding to the first CG, an identifier of a BWP corresponding to the first CG, an identifier of the first CG, or state indication information of the first CG, where the state indication information of the first CG is used for indicating whether the first CG is in an activated state or in a released state.

Optionally, in some implementations, the feedback information of the first state includes at least one of: an identifier of the first state, an identifier of a cell corresponding to the first state, an identifier of a BWP corresponding to the first state, or state indication information of the first state, wherein the state indication information of the first state is used for indicating whether the first state is an activated state or a released state.

Optionally, in some implementations, the first indication information is an LCID, where different values of the LCID are used for indicating whether the feedback MAC CE is the feedback of the terminal device on activation or release of a CG configuration and/or the feedback of the terminal device on activation or release of a state.

Optionally, in some implementations, the first indication information has at least one bit, where different values of the at least one bit are used for indicating whether the feedback MAC CE is the feedback of the terminal device on activation or release of a CG configuration and/or the feedback of the terminal device on activation or release of a state.

Optionally, in some implementations, the first indication information has a first bit and a second bit, where a value of the first bit is used for indicating whether the feedback MAC CE contains feedback information of the terminal device on activation or release of a CG configuration, and a value of the second bit is used for indicating whether the feedback MAC CE contains the feedback information of the terminal device on activation or release of a state.

Optionally, in other implementations, the first indication information has one bit, where different values of the one bit are used for indicating whether the feedback MAC CE is the feedback of the terminal device on activation or release of a CG configuration and/or the feedback of the terminal device on activation or release of a state.

Optionally, in some implementations, the resource carrying the feedback MAC CE includes at least one of: a time-domain resource used for carrying the feedback MAC CE, a frequency-domain resource used for carrying the feedback MAC CE, a port used for carrying the feedback MAC CE, a code-domain resource used for carrying the feedback MAC CE, a beam used for carrying the feedback MAC CE, a beam used for carrying a PUSCH of the feedback MAC CE, a port used for carrying a PUSCH of the feedback MAC CE, or a code-domain resource used for carrying a PUSCH of the feedback MAC CE.

Optionally, in some implementations, the communicating module 410 is configured to receive first DCI transmitted by the network device, where the first DCI includes a first identifier and an activation state indication, and the activation state indication is used for indicating to activate or release a CG configuration or a state corresponding to the first identifier.

Optionally, in some implementations, the first DCI further includes second indication information, where the second indication information is used for indicating whether the first identifier is an identifier of a CG configuration or an identifier of a state.

Optionally, in some implementations, the communicating module is further configured to: receive higher layer signaling transmitted by the network device, where the higher layer signaling contains a correspondence between states and CG configurations.

Optionally, in some implementations, the higher layer signaling is a dedicated RRC message.

The communicating module described above may be a communication interface or a transceiver, or may be an input-output interface of a communication chip or a system-on-chip (SOC).

It should be understood that, the terminal device 400 according to implementations may correspond to the terminal device in the foregoing method implementations, and the above and other operations and/or functions implemented by various units of the terminal device 400 are respectively intended for implementing corresponding operations of the terminal device in the method 200 illustrated in FIG. 2, which will not be repeated herein for the sake of simplicity.

FIG. 5 is a schematic block diagram of a network device provided in implementations of the disclosure. As illustrated in FIG. 5, the network device 500 includes a communicating module 510. The communicating module 510 is configured to operate as follows. The communicating module 510 is configured to transmit a first command to a terminal device. The first command is used for activating or releasing a first CG configuration or a first state, where the first state corresponds to at least one CG configuration. The communicating module 510 is configured to receive a feedback MAC CE of the first command transmitted by the terminal device. The feedback MAC CE contains first indication information, where the first indication information is used for indicating whether the feedback MAC CE is feedback of the terminal device on activation or release of a CG configuration and/or feedback of the terminal device on activation or release of a state. Alternatively, a resource carrying the feedback MAC CE is used for indicating whether the feedback MAC CE is feedback of the terminal device on activation or release of a CG configuration and/or feedback of the terminal device on activation or release of a state.

Optionally, in some implementations, when the first command is used for activating or releasing the first CG configuration, the feedback MAC CE at least contains feedback information of the first CG configuration. Alternatively, when the first command is used for activating or releasing the first state, the feedback MAC CE at least contains feedback information of the first state.

Optionally, in some implementations, the feedback information of the first CG configuration includes at least one of: an identifier of a cell corresponding to the first CG, an identifier of a BWP corresponding to the first CG, an identifier of the first CG, or state indication information of the first CG, where the state indication information of the first CG is used for indicating whether the first CG is in an activated state or in a released state.

Optionally, in some implementations, the feedback information of the first state includes at least one of: an identifier of the first state, an identifier of a cell corresponding to the first state, an identifier of a BWP corresponding to the first state, or state indication information of the first state, where the state indication information of the first state is used for indicating whether the first state is an activated state or a released state.

Optionally, in some implementations, the first indication information is an LCID, where different values of the LCID are used for indicating whether the feedback MAC CE is the feedback of the terminal device on activation or release of a CG configuration and/or the feedback of the terminal device on activation or release of a state.

Optionally, in some implementations, the first indication information has at least one bit, where different values of the at least one bit are used for indicating whether the feedback MAC CE is the feedback of the terminal device on activation or release of a CG configuration and/or the feedback of the terminal device on activation or release of a state.

Optionally, in some implementations, the first indication information has a first bit and a second bit, where a value of the first bit is used for indicating whether the feedback MAC CE contains feedback information of the terminal device on activation or release of a CG configuration, and a value of the second bit is used for indicating whether the feedback MAC CE contains the feedback information of the terminal device on activation or release of a state.

Optionally, in other implementations, the first indication information has one bit, where different values of the one bit are used for indicating whether the feedback MAC CE is the feedback of the terminal device on activation or release of a CG configuration and/or the feedback of the terminal device on activation or release of a state.

Optionally, in some implementations, the resource carrying the feedback MAC CE includes at least one of: a time-domain resource used for carrying the feedback MAC CE, a frequency-domain resource used for carrying the feedback MAC CE, a port used for carrying the feedback MAC CE, a code-domain resource used for carrying the feedback MAC CE, a beam used for carrying the feedback MAC CE, a beam used for carrying a PUSCH of the feedback MAC CE, a port used for carrying a PUSCH of the feedback MAC CE, or a code-domain resource used for carrying a PUSCH of the feedback MAC CE.

Optionally, in some implementations, the communicating module 510 is configured to transmit first DCI to the terminal device, where the first DCI includes a first identifier and an activation state indication, and the activation state indication is used for indicating to activate or release a CG configuration or a state corresponding to the first identifier.

Optionally, in some implementations, the first DCI further includes second indication information, where the second indication information is used for indicating whether the first identifier is an identifier of a CG configuration or an identifier of a state.

Optionally, in some implementations, the communicating module 510 is further configured to transmit higher layer signaling to the terminal device, where the higher layer signaling contains a correspondence between states and CG configurations.

Optionally, in some implementations, the higher layer signaling is a dedicated RRC message.

The communicating module described above may be a communication interface or a transceiver, or may be an input-output interface of a communication chip or an SOC.

It should be understood that, the network device 500 according to implementations may correspond to the network device in the foregoing method implementations, and the above and other operations and/or functions implemented by various units of the network device 500 are respectively intended for implementing corresponding operations of the network device in the method 300 illustrated in FIG. 3, which will not be repeated herein for the sake of simplicity.

FIG. 6 is a schematic structural diagram of a communication device 600 provided in implementations of the disclosure. As illustrated in FIG. 6, the communication device 600 includes a processor 610. The processor 610 can invoke and execute computer programs stored in a memory to perform the method provided in implementations.

As illustrated in FIG. 6, the communication device 600 can further include the memory 620. The processor 610 can invoke and execute the computer programs stored in the memory 620 to perform the method provided in implementations.

The memory 620 may be a separate device independent of the processor 610, or may be integrated into the processor 610.

As illustrated in FIG. 6, the communication device 600 can further include a transceiver 630. The processor 610 can control the transceiver 630 to communicate with other devices, for example, to send information or data to other devices, or to receive information or data from other devices.

The transceiver 630 may include a transmitter and a receiver. The transceiver 630 may further include an antenna, where one or more antenna can be provided.

The communication device 600 may be operable as the network device of implementations, and the communication device 600 can implement the operations performed by the network device described in the foregoing method implementations, which will not be repeated herein for the sake of simplicity.

Alternatively, the communication device 600 may be operable as the mobile terminal/the terminal device of implementations, and the communication device 600 can implement the operations performed by the mobile terminal/the terminal device described in the foregoing method implementations, which will not be repeated herein for the sake of simplicity.

Figure 7:
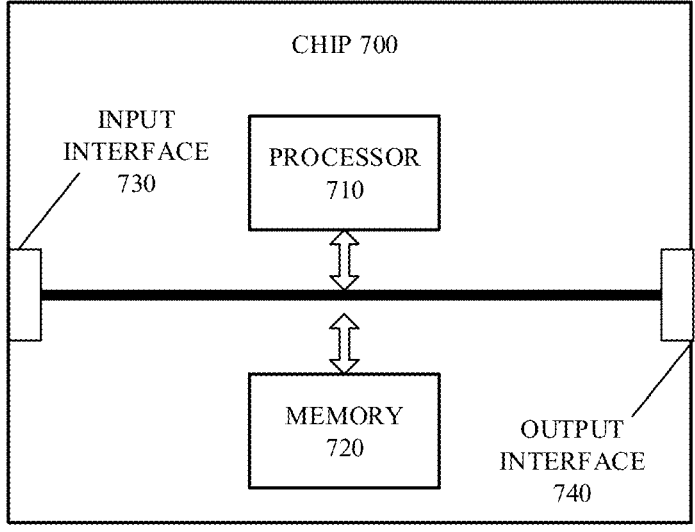
FIG. 7 is a schematic block diagram of a chip provided in implementations of the disclosure.

FIG. 7 is a schematic structural diagram of a chip provided in implementations of the disclosure. As illustrated in FIG. 7, the chip 700 includes a processor 710. The processor 710 is configured to invoke and execute computer programs stored in a memory to perform the method provided in implementations.

As illustrated in FIG. 7, the chip 700 further includes the memory 720. The processor 710 can invoke and execute the computer programs stored in the memory 720 to perform the method provided in implementations.

The memory 720 may be a separate device independent of the processor 710, or may be integrated into the processor 710.

The chip 700 may further include an input interface 730. The processor 710 can control the input interface 730 to communicate with other devices or chips, for example, to acquire information or data sent by other devices or chips.

The chip 700 may further include an output interface 740. The processor 710 can control the output interface 740 to communicate with other devices or chips, for example, to output information or data to other devices or chips.

The chip is applicable to the network device of implementations. The chip can implement the operations performed by the network device described in the foregoing method implementations, which will not be repeated herein for the sake of simplicity.

Alternatively, the chip is applicable to the mobile terminal/the terminal device of implementations. The chip can implement the operations performed by the mobile terminal/the terminal device described in the foregoing method implementations, which will not be repeated herein for the sake of simplicity.

It should be understood that, the chip herein may also be referred to as a system-on-chip (SOC).

Figure 8:
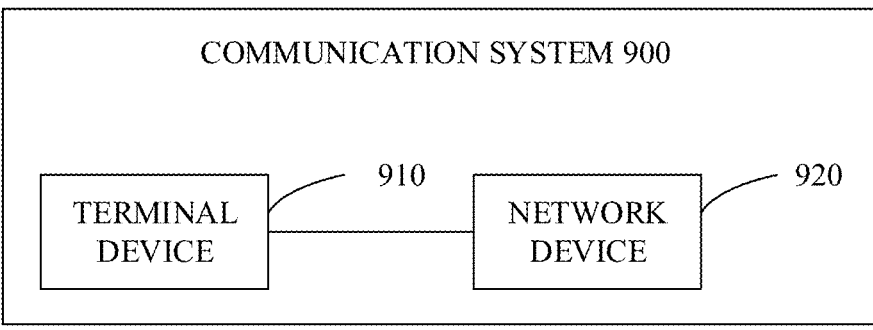
FIG. 8 is a schematic block diagram of a communication system provided in implementations of the disclosure.

FIG. 8 is a schematic block diagram of a communication system 900 provided in implementations of the disclosure. As illustrated in FIG. 8, the communication system 900 includes a terminal device 910 and a network device 920.

The terminal device 910 can implement functions of the terminal device described in the foregoing method implementations, and the network device 920 can implement functions of the network device described in the foregoing method implementations, which will not be repeated herein for the sake of simplicity.

It should be understood that, the processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory according to implementations may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Implementations further provide a computer readable storage medium. The computer readable storage medium is configured to store computer programs.

The computer readable storage medium is applicable to the network device of implementations. The computer programs, when executed, are operable with a computer to implement the operations performed by the network device described in the foregoing method implementations, which will not be repeated herein for the sake of simplicity.

Alternatively, the computer readable storage medium is applicable to the mobile terminal/the terminal device of implementations. The computer programs, when executed, are operable with a computer to implement the operations performed by the mobile terminal/the terminal device described in the foregoing method implementations, which will not be repeated herein for the sake of simplicity.

Implementations further provide a computer program product. The computer program product includes computer program instructions.

The computer program product is applicable to the network device of implementations. The computer program instructions, when executed, are operable with a computer to implement the operations performed by the network device described in the foregoing method implementations, which will not be repeated herein for the sake of simplicity.

Alternatively, the computer program product is applicable to the mobile terminal/the terminal device of implementations. The computer program instructions, when executed, are operable with a computer to implement the operations performed by the mobile terminal/the terminal device described in the foregoing method implementations, which will not be repeated herein for the sake of simplicity.

Implementations further provide a computer program.

The computer program is applicable to the network device of implementations. The computer program, when executed by a computer, is operable with the computer to implement the operations performed by the network device described in the foregoing method implementations, which will not be repeated herein for the sake of simplicity.

Alternatively, the computer program is applicable to the mobile terminal/the terminal device of implementations. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless communication method, comprising:
receiving, by a terminal device, a first command transmitted by a network device, wherein the first command is used for deactivating a first state, wherein the first state corresponds to at least one configured grant (CG) configuration;
deactivating the first state; and
transmitting, by the terminal device, a feedback media access control (MAC) control element (CE) of the first command to the network device;
wherein the feedback MAC CE contains first indication information and feedback information of the first state, wherein the first indication information is used for indicating that the feedback MAC CE is feedback of the terminal device on deactivation of a state, wherein the first indication information is a logical channel identity (LCID);
wherein the method further comprises:
receiving, by the terminal device, a state table configured by the network device, wherein the state table contains a plurality of states, and wherein each of the plurality of states is an activation state or a deactivation state and corresponds to a state index, and each state corresponds to one or more CG configurations; wherein the state table is provided for the terminal device to determine the CG configuration corresponding to the first state which is deactivated;
wherein receiving, by the terminal device, the first command transmitted by the network device comprises:
receiving, by the terminal device, first downlink control information (DCI) transmitted by the network device, wherein the first DCI comprises a first identifier and an activation state indication, and the activation state indication indicates to deactivate the first state, wherein the first state corresponds to at least one CG configuration corresponding to the first identifier;
wherein the first DCI further comprises second indication information, wherein the second indication information indicates whether the first identifier is an identifier of a CG configuration or an identifier of a state.

2. The method of claim 1, further comprising:
receiving, by the terminal device, higher layer signaling transmitted by the network device, wherein the higher layer signaling contains a correspondence between states and CG configurations.

3. The method of claim 2, wherein the higher layer signaling is a dedicated radio resource control (RRC) message.

4. The method of claim 1, wherein the feedback information of the first state comprises at least one of: an identifier of the first state, an identifier of a cell corresponding to the first state, an identifier of a BWP corresponding to the first state, or state indication information of the first state, where the state indication information of the first state is used for indicating the first state is a deactivated state.

5. A terminal device, comprising:
a transceiver;
a processor; and
a memory configured to store computer programs which, when executed by the processor, are operable with the transceiver to:
receive a first command transmitted by a network device, wherein the first command is used for deactivating a first state, wherein the first state corresponds to at least one configured grant (CG) configuration;
deactivate the first state; and
transmit a feedback media access control (MAC) control element (CE) of the first command to the network device;
wherein the feedback MAC CE contains first indication information and feedback information of the first state, wherein the first indication information is used for indicating that the feedback MAC CE is feedback of the terminal device on deactivation of a state, wherein the first indication information is a logical channel identity (LCID);
wherein the computer programs, when executed by the processor, are operable with the transceiver to:
receive, by the terminal device, a state table configured by the network device, wherein the state table contains a plurality of states, and wherein each of the plurality of states is an activation state or a deactivation state and corresponds to a state index, and each state corresponds to one or more CG configurations; wherein the state table is provided for the terminal device to determine the CG configuration corresponding to the first state which is deactivated;

wherein the computer programs, when executed by the processor, are operable with the transceiver to:

receive first downlink control information (DCI) transmitted by the network device, wherein the first DCI comprises a first identifier and an activation state indication, and the activation state indication indicates to activate or deactivate a CG configuration corresponding to the first identifier;

wherein the first DCI further comprises second indication information, wherein the second indication information indicates whether the first identifier is an identifier of a CG configuration or an identifier of a state.

6. The terminal device of claim 5, wherein the computer programs, when executed by the processor, are operable with the transceiver to:

receive higher layer signaling transmitted by the network device, wherein the higher layer signaling contains a correspondence between states and CG configurations.

7. The terminal device of claim 5, wherein the feedback information of the first state comprises at least one of: an identifier of the first state, an identifier of a cell corresponding to the first state, an identifier of a BWP corresponding to the first state, or state indication information of the first state, where the state indication information of the first state is used for indicating the first state is a deactivated state.

8. A network device, comprising:

a transceiver;

a processor; and a memory configured to store computer programs which, when executed by the processor, are operable with the transceiver to:

transmit a first command to a terminal device, wherein the first command is used for deactivating a first state, wherein the first state corresponds to at least one configured grant (CG) configuration; and receive a feedback media access control (MAC) control element (CE) of the first command transmitted by the terminal device after the terminal device deactivates the first state;

wherein the feedback MAC CE contains first indication information and feedback information of the first state, wherein the first indication information is used for indicating that the feedback MAC CE is feedback of the terminal device on deactivation of a state, wherein the first indication information is a logical channel identity (LCID);

wherein the computer programs, when executed by the processor, are operable with the transceiver to:

transmit a state table to the terminal device, wherein the state table contains a plurality of states, and wherein each of the plurality of states is an activation state or a deactivation state and corresponds to a state index, and each state corresponds to one or more CG configurations; wherein the state table is provided for the terminal device to determine the CG configuration corresponding to the first state which is deactivated;

wherein the computer programs, when executed by the processor, are operable with the transceiver to:

transmit first DCI to the terminal device, wherein the first DCI comprises a first identifier and an activation state indication, and the activation state indication indicates to activate or deactivate a CG configuration corresponding to the first identifier;

wherein the first DCI further comprises second indication information, wherein the second indication information indicates whether the first identifier is an identifier of a CG configuration or an identifier of a state.

9. The network device of claim 8, wherein the computer programs, when executed by the processor, are operable with the transceiver to:

transmit higher layer signaling to the terminal device, wherein the higher layer signaling contains a correspondence between states and CG configurations.

10. The network device of claim 9, wherein the higher layer signaling is a dedicated radio resource control (RRC) message.

11. The network device of claim 8, wherein the feedback information of the first state comprises at least one of: an identifier of the first state, an identifier of a cell corresponding to the first state, an identifier of a BWP corresponding to the first state, or state indication information of the first state, where the state indication information of the first state is used for indicating the first state is a deactivated state.

* * * * *